US007940767B2

(12) United States Patent
Elias et al.

(10) Patent No.: US 7,940,767 B2
(45) Date of Patent: May 10, 2011

(54) METHOD AND SYSTEM OF ROUTING A COMMUNICATION WITHIN A NETWORK

(75) Inventors: Mark Elias, Eastpointe, MI (US);
Sherry Soja-Molloy, Taylor, MI (US);
Michael Taylor, Brentwood, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 436 days.

(21) Appl. No.: 11/942,837

(22) Filed: Nov. 20, 2007

(65) Prior Publication Data
US 2009/0129382 A1 May 21, 2009

(51) Int. Cl.
*H04L 12/28* (2006.01)
*H04L 12/56* (2006.01)
*H04J 3/26* (2006.01)
*H04J 3/16* (2006.01)
*H04J 3/22* (2006.01)

(52) U.S. Cl. .......................... 370/392; 370/432; 370/469
(58) Field of Classification Search .......................... None
See application file for complete search history.

(56) References Cited

U.S. PATENT DOCUMENTS

| | | | | |
|---|---|---|---|---|
| 6,047,325 A * | 4/2000 | Jain et al. | | 709/227 |
| 7,133,413 B2 | 11/2006 | Hoebeke | | |
| 7,630,637 B2 * | 12/2009 | Mizutani et al. | | 398/67 |
| 2002/0144262 A1 * | 10/2002 | Plotnick et al. | | 725/32 |
| 2003/0219015 A1 * | 11/2003 | Constant Six et al. | | 370/389 |
| 2005/0135365 A1 | 6/2005 | Sung et al. | | |
| 2006/0013247 A1 * | 1/2006 | Koch et al. | | 370/437 |
| 2006/0221960 A1 | 10/2006 | Borgione | | |
| 2008/0095160 A1 * | 4/2008 | Yadav et al. | | 370/390 |
| 2008/0285578 A1 * | 11/2008 | DeLay et al. | | 370/412 |
| 2009/0067840 A1 * | 3/2009 | Bernard et al. | | 398/67 |
| 2009/0109972 A1 * | 4/2009 | Chen | | 370/390 |
| 2009/0161593 A1 * | 6/2009 | Godor et al. | | 370/312 |

OTHER PUBLICATIONS

"Multicast in MPLS/BGP IP VPNs," Rosen & Raggarwa, Network Working Group, Internet Draft draft-ietf-13vpn-2547bis-mcast-05. txt, www.ietf.org, Jul. 2007, 80 pgs.
"Encapsulation Methods for Transport of Layer 2 Frames Over MPLS Networks," Martini et al., Network Working Group, Internet Draft draft-martini-12circuit-encap-mpls-10.txt, Jan. 2006, 18 pgs.
"Multicast in MPLS/BGP IP VPNs," Rosen et al., Network Working Group, Internet Draft draft-rosen-vpn-mcast-08.txt, Dec. 2004, 21 pgs.

* cited by examiner

*Primary Examiner* — Gregory B Sefcheck
*Assistant Examiner* — Ashley L Shivers
(74) *Attorney, Agent, or Firm* — Larson Newman & Abel, LLP (57) ABSTRACT

A method can be used to route a communication within a network. The method can include receiving a first communication at a first edge router, wherein the first communication is a Layer 2 communication. The method can also include determining that the first communication has a destination that includes a first multicast group and a second multicast group different from the first multicast group. The method can also include encapsulating the first communication within a second communication, wherein the second communication is a Layer 3 communication, and wherein the second communication is a single communication. The method can further include sending the second communication towards the first multicast group and the second multicast group. A system can be configured to carry out the method.

11 Claims, 9 Drawing Sheets

METHOD AND SYSTEM OF ROUTING A COMMUNICATION WITHIN A NETWORK

FIELD OF THE DISCLOSURE

The present disclosure generally relates to networks or methods of using the same, and more particularly relates to methods and systems of routing a communication within a network.

BACKGROUND

Communications are frequently sent from an end user of a network to other end users of the same network. At a client computer of an end user, a communication can include ethernet frames that are sent from the client computer, via the client computer's media access controller, to an edge router of a service provider. If the communication is to remain an OSI model Layer 2 communication, the edge router will send a copy to each of the end users that are to receive the communication. Thus, if the communication has 1000 recipients, the edge router will generate 1000 copies and send those copies to the 1000 recipients.

As an alternative, use of multicast groups has been suggested to reduce the number of copies generated and transmitted. Networks can be optimized around individual multicast groups, as a communication is more likely to be sent to one or a few multicast groups rather than many. A communication from an end user can be received by an edge router and encapsulated into a packet. The edge router can generate a copy for each multicast group and send them using an Internet protocol address corresponding to the multicast groups.

BRIEF DESCRIPTION OF THE DRAWINGS

Skilled artisans will appreciate that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

The numerous innovative teachings of the present application will be described with particular reference to the presently preferred exemplary embodiments. However, understand that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
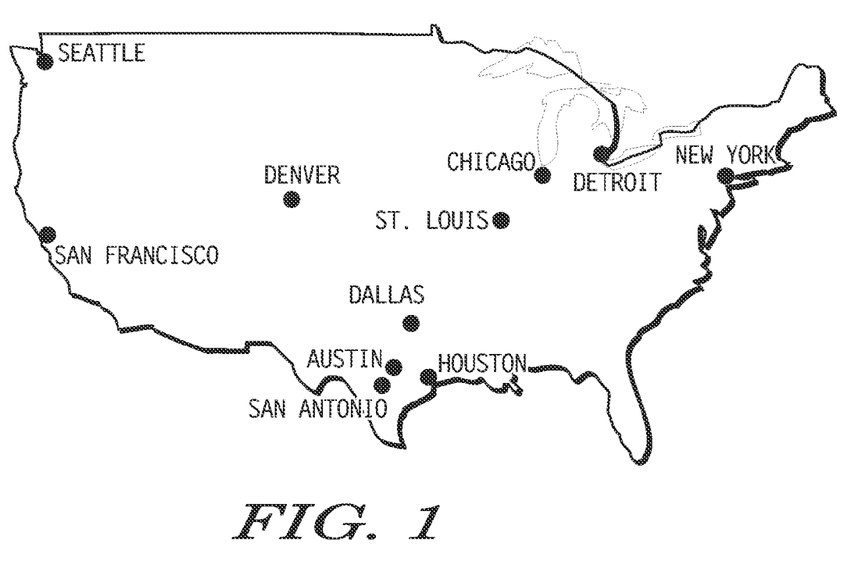
FIG. 1 includes an illustration of different geographic sites that are interconnected to one another by a network.

FIG. 1 includes an illustration of different geographic sites that are interconnected to one another by a network. More particularly, FIG. 1 includes different cities within the continental United States. In this particular embodiment, the cities include Seattle, San Francisco, Denver, Dallas, Austin, San Antonio, Houston, St. Louis, Chicago, Detroit, and New York City. More, fewer, or different cities can be part of the network. Also, the network can extend outside of the continental United States. Still further, the geographic sites do not have to correspond to cities. For example, more than one geographic site may be present within the same city. After reading this specification, skilled artisans will appreciate that the physical divisions, such as sites, can be tailored to the particular needs or desires of a network architect.

Although not illustrated, the sites in FIG. 1 can be coupled to one another using a private network, a public network (e.g., the World Wide Web), or any combination thereof (e.g., a private network within a site and a public network between sites). The significance of the different sites will become apparent in a particular example described later in this specification.

Figure 2:
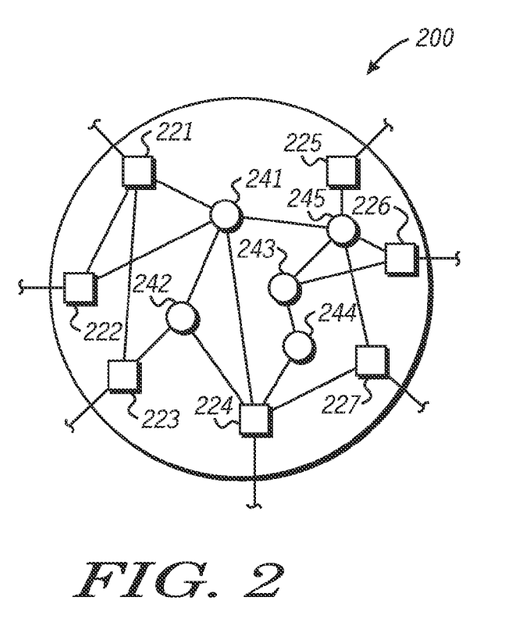
FIG. 2 includes a block diagram illustrating interconnections between routers at any of the geographic sites in FIG. 1.

The network 200 can include routers at a site or a collection of sites. FIG. 2 includes an illustration of a plurality of routers that are coupled to one another. The plurality of routers includes edge routers 221 to 227 and intermediate routers 241 to 245. Each of the edge and intermediate routers can route communications between any combination of other edge routers and intermediate routers. The edge routers 221 to 227 are configured and operable to interact with devices outside of the network. For example, the edge routers 221 to 227 can be coupled to computers of end users or computers of other service providers. This ability to interact with computers outside of a particular service provider's network 200 may require special handling of communications, such as different protocols or data formats, or making copies of communications and routing such copies. Unlike the edge routers 221 to 227, the intermediate routers 241 to 245 do not have to meet the requirements of edge routers. Thus, from a functional standpoint, the intermediate routers 241 to 245 may be different from the edge routers 221 to 227.

Figure 3:
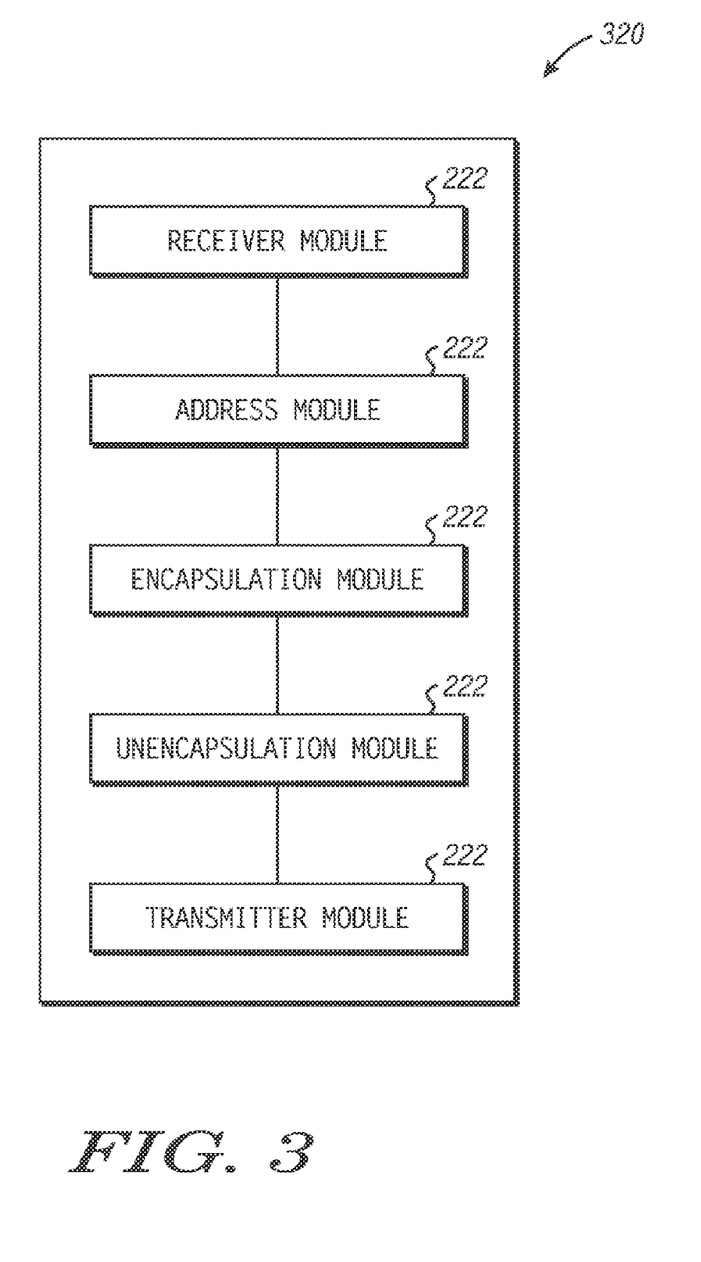
FIG. 3 includes a block diagram illustrating modules that may be within an edge router.

FIG. 3 includes a block diagram of modules that may be within an edge router 320 that may be used for any of the edge routers 221 to 227 as illustrated in FIG. 2. The edge router 320 can include a receiver module 322, an address module 324, an encapsulation module 326, an unencapsulation module 328, and a transmitter module 328. The receiver module 322 can be configured and operable to receive communications from outside the network or the particular site, from an intermediate router, from another edge router, or any combination thereof. If needed or desired, the receiving module 322 can change the protocol or format of the communication, so that information within the communication can be more readily used by the edge router 320 or other routers within the network.

The address module 324 can be configured and operable to read and understand a source address of a communication, read and understand a destination address of the communication, access address resolution protocol (ARP) data (e.g., table within a database, a file, or the like), modify the source address, modify the destination address, or any combination thereof. The ARP data can include mappings between media access controller (MAC) addresses and Internet protocol (IP) addresses. An example of modifying an address can include changing a MAC address to an IP address or vice versa. The term "accessing," with respect to information or other data as used throughout this specification, is to be broadly construed and includes retrieving, allowing receipt, or otherwise obtaining such information or such other information by a device within the network.

The encapsulating module 326 can be configured and operable to generate copies of the communication or a portion of the communication (e.g., the content or payload of ethernet frames), encapsulate a Layer 2 communication or a portion thereof into a Layer 3 communication (e.g., encapsulate ethernet frames within packets), or any combination thereof. As used herein, the term "payload" refers to substantive information within the communication, wherein the substantive information is to be for consumed or used by a recipient, and the term "content" refers to any information within the communication. Thus, within a particular ethernet frame or packet, the payload is part of the content but not headers, and the content includes headers and other metadata in addition to the payload of the particular ethernet frame or packet.

In one particular embodiment, the encapsulating module 326 can receive a communication in the form of ethernet frames, which are examples of Open Systems Interconnection (OSI) model Layer 2 data, and generate another communication in the form of packets, which are examples of OSI Layer 3 data. In one embodiment, the content of the ethernet frames can be encapsulated, and in another embodiment, only the payload of the ethernet frames can be encapsulated.

The unencapsulating module 328 can be configured and operable to generate copies of the communication or a portion of the communication (e.g., the contents or payloads of the communication), unencapsulate a Layer 3 communication and retrieve a Layer 2 communication therein, convert a Layer 3 communication into a Layer 2 communication, or any combination thereof. For example, the unencapsulating module 326 can receive a communication in the form of packets and generate another communication in the form of ethernet frames. In one embodiment, an entire ethernet frame can be unencapsulated from a packet, and in another embodiment, only the payload of the packet can be unencapsulated.

The addressing of a communication can be performed by the address module 324, the encapsulation module 326, the unencapsulation module 328, or any combination thereof. The edge router can be configured and operable to allow the appropriate information to pass between modules, so that the proper addresses are used for the communication.

The transmitter module 330 can receive a communication from another module within the edge router 320 and transmit the communication towards the destination address. In one embodiment, the transmitter module 330 can transmit the communication to an intermediate router 241 to 245, to another edge router 221 to 227, to a computer of another end user of the service provider, to a computer of another service provider, or any combination thereof. Thus, in one embodiment, the communications (Layer 2 communications and Layer 3 communications) may be routed through one or more other routers or may not be routed through any other router within the network.

Although not illustrated, each of the modules may include hardware, software, firmware, or any combination thereof to perform the methods and functions as described herein. Functionality in one module may be combined with a different module. For example the functions of the encapsulation module 326 and the unencapsulation module 328 could be combined in another embodiment. Functionality in one module could be divided into different modules. For example, the address module 324 could have a module to parse source and destination addresses and another module to query a database for ARP data. Further, functions of different modules may be partitioned in a different manner than illustrated or described. After reading this specification, skilled artisans will appreciate that other architectures and configurations can be used.

The devices within the network (e.g., routers) and modules described herein can be implemented using a general computing system, and the methods described can be carried out by the general computing system that may be located within the network.

Figure 4:
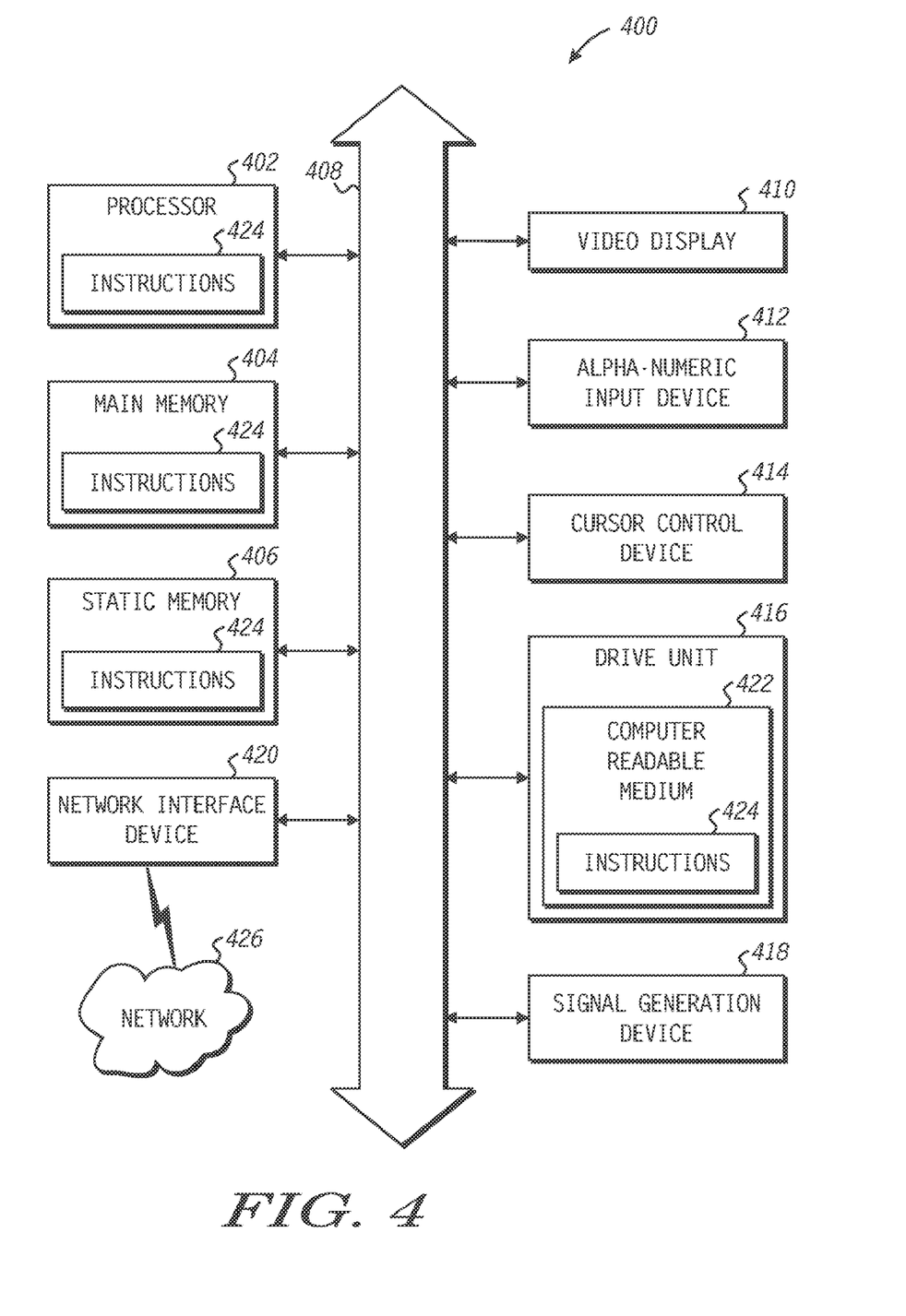
FIG. 4 includes a block diagram of an illustrative embodiment of a general computer system.

FIG. 4 includes an illustrative embodiment of a general computer system 400. The computer system 400 can include a set of instructions that can be executed to cause the computer system 400 to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a desktop PC, a laptop PC, an STB, a personal digital assistant (PDA), a mobile device, a palmtop computer, a laptop computer, a desktop computer, a communications device, a wireless telephone, a wireline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

Figure 5:
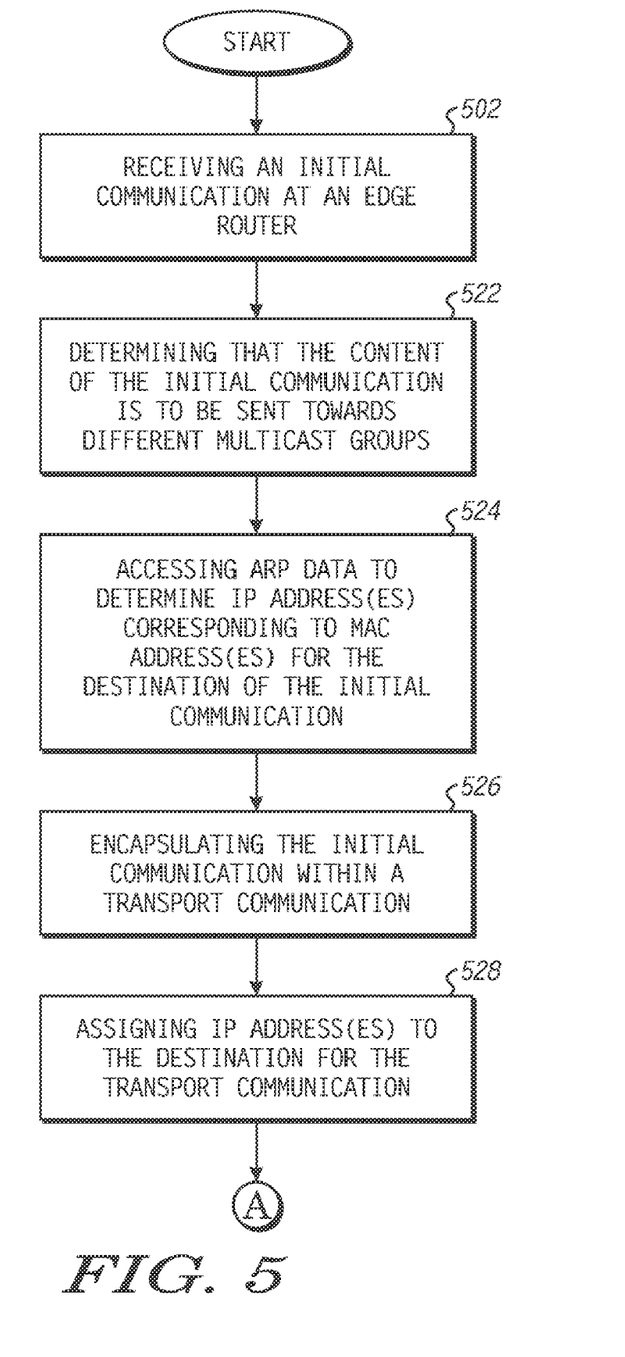
FIGS. 5 to 7 include a flow diagram illustrating actions that can be taken in routing a communication within the network.
Figure 6:
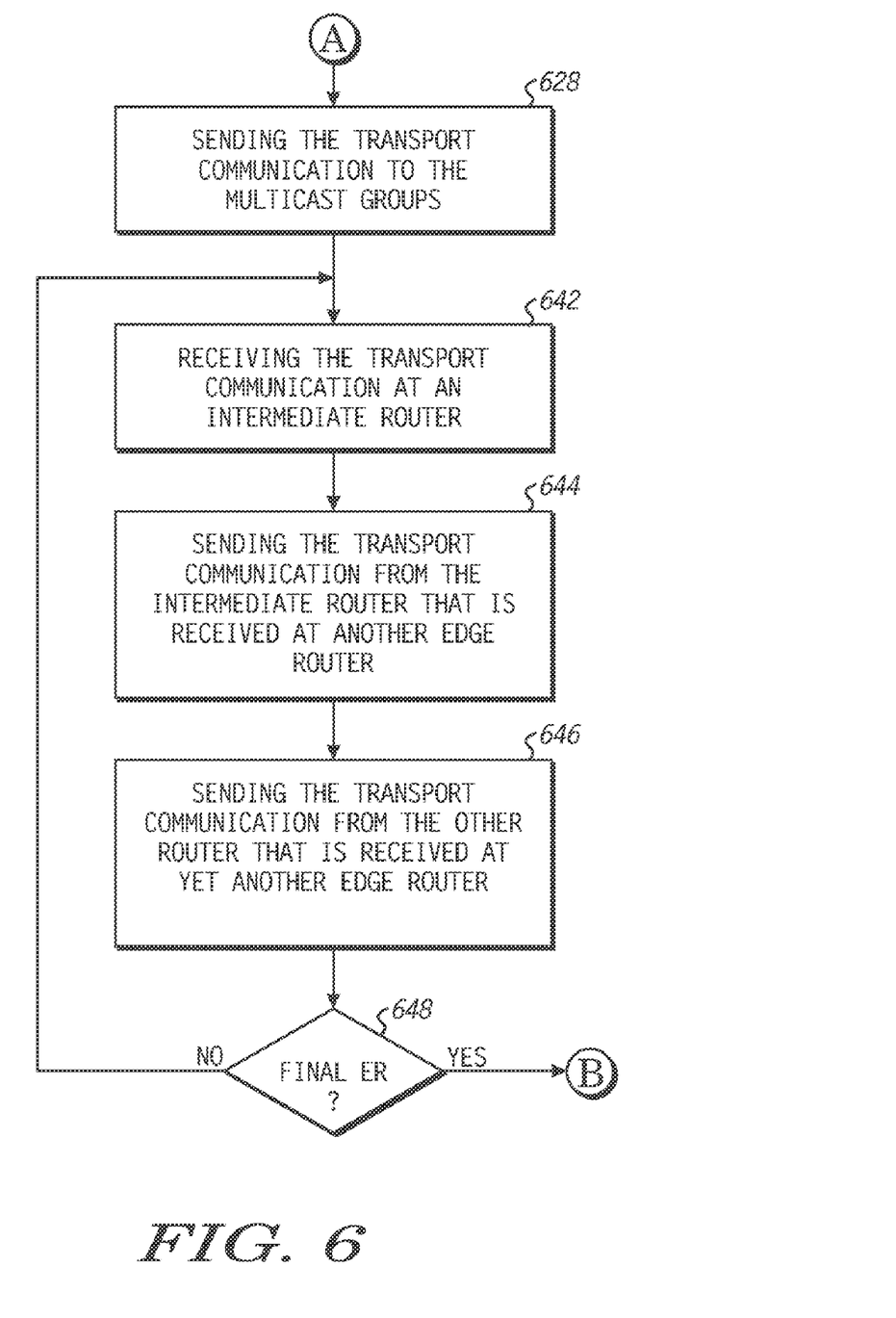
Figure 7:
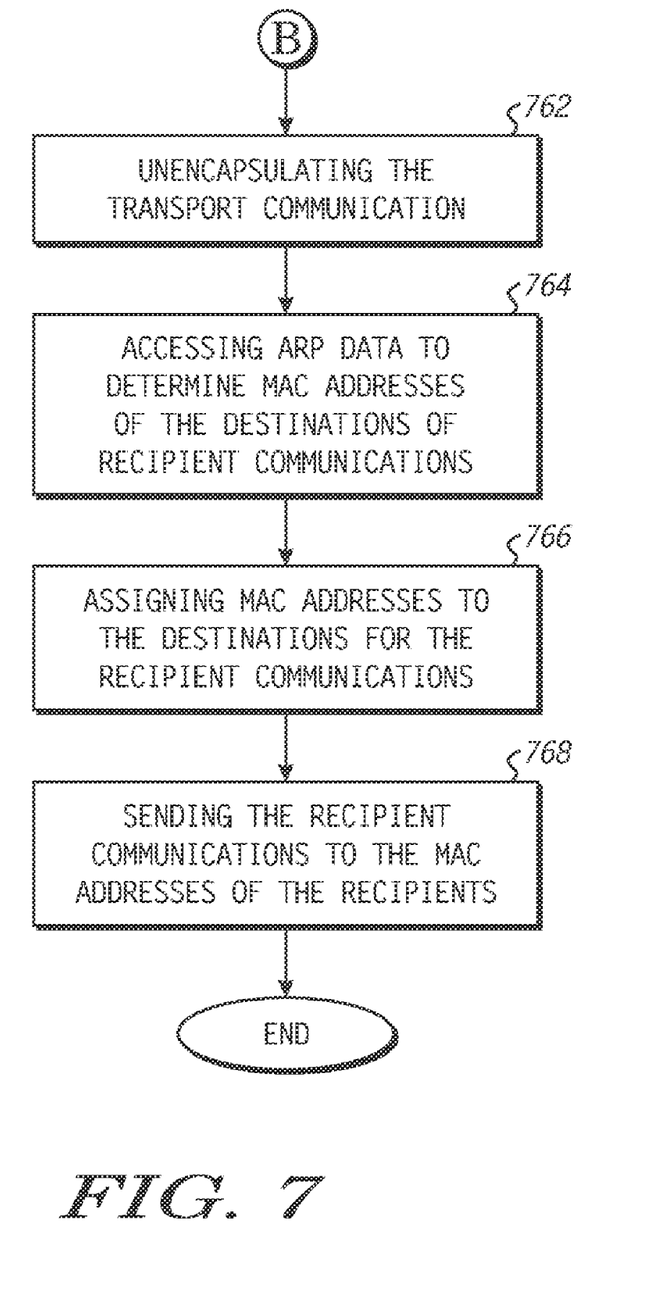

Attention is now directed to method of using the network as described herein to send a communication to a plurality of multicast groups, such as a broadcast communication to all devices of end users for those devices coupled to the network. FIGS. 5 to 7 include a flow diagram illustrating actions that can be taken in routing a communication within the network. The method will be described with respect to routers and modules as illustrated in FIGS. 2 and 3. The method can include receiving an initial communication at an edge router, at block 502 in FIG. 5. Referring to FIG. 3, the initial communication can be received as ethernet frames at the receiver module 322. The source and destination addresses can be MAC addresses. The initial communication can include more than one destination address. The receiver module 322 can forward the initial communication to the address module 324.

The method can also include determining that the content of the initial communication is to be sent towards different multicast groups, at block 522 in FIG. 5. The address module 324 can read the destination address and realize that the initial communication is for a plurality of different multicast groups. For example, the initial communication is a broadcast communication that is intended for all users of the network. In another embodiment, the initial communication may be for some of the different multicast groups, but not necessarily all of the multicast groups.

The method can further include accessing ARP data to determine IP address(es) corresponding to MAC address(es) for the destination of the initial communication, at block 524 in FIG. 5. The address module 324 can query a database or retrieve a file or information from a file to obtain the IP address(es). The initial communication and the information regarding the MAC and IP addresses can be forwarded to the encapsulating module 326.

The method can still further include encapsulating the initial communication within a transport communication, at block 526 in FIG. 5. The encapsulation module 326 can encapsulate all or part of the initial communication, which is a Layer 2 communication, into a transport communication, which is a Layer 3 communication that includes packets. In one embodiment, the content of the ethernet frame becomes the payload of a packet. In another embodiment, the payload of the ethernet frame is extracted, and the payload of the ethernet frame, as opposed to the entire content, is encapsulated into the payload of the packet. If needed, copies of the Layer 3 communication are made; however, the number of copies is less than the number of multicast groups.

The method can yet further include assigning IP address(es) to the destination for the transport communication, at block 528 in FIG. 5. The assigning of IP address(es) can be done by the address module 324 or the encapsulating module 326. The MAC source address is replaced by an IP source address, and the MAC destination address(es) are replaced by IP destination address(es). Each copy of the transport communication will have one or more IP destination addresses. The copies of the transport communication can be forwarded to the transmitter module 328. The method can include sending the transport communication to the multicast groups, at block 628 in FIG. 6. In one embodiment, the transport communication leaves the edge router as a Layer 3 communication with an IP address.

The method can further include receiving the transport communication at an intermediate router, sending the transport communication from the intermediate router that is received at another edge router, and sending the transport communication from the other router that is received at yet another edge router, at blocks 642, 644, and 646 in FIG. 6. In a particular embodiment, the transport communication can be routed by one or more intermediate routers before reaching another edge router at the same site as the edge router used in generating the Layer 3 communication. After leaving that site, the transport communication can be received by an edge router at yet another site. In another embodiment, not all of the routers in FIG. 6 are required. For example, no intermediate router is needed in a particular embodiment. Also, the edge router that generated the Layer 3 communication may send the transport communication to the edge router at the other side, without the need of any other router. In a further embodiment, the transport communication may not leave the site. The transport communication can be sent to a different edge router, which may be the final edge router along the transmission path to the destination address(es). After reading this specification, skilled artisans will appreciate the method is flexible and can be tailored to a particular network architecture.

A determination is made whether or not the transport communication is at the final edge router (Final ER) for the intended recipients, at decision tree 648 in FIG. 6. The determination can be made by the edge router or by another device in the network, wherein the edge router or other device can have network topology information, routing information, other suitable information, or any combination thereof. If the transport communication is not at the final edge route ("No" branch from decision tree 648), additional routing can occur. The additional routing may use another intermediate router, edge router, or any combination thereof.

If the transport communication is at the final edge router, or after the transport communication reaches the final edge router, ("Yes" branch from decision tree 648), the method can still further include unencapsulating the transport communication, at block 762 in FIG. 7. In one embodiment, the unencapsulation module 328 can unencapsulate the packets of the transport communication to retrieve the content of the initial communication. After unencapsulation, the unencapsulated ethernet frames may be substantially identical to the ethernet frames of the initial communication prior to encapsulation. In another embodiment, the payload from the packets in the transport communication can be extracted and inserted as the payload for ethernet packets. Regardless of unencapsulation method, copies of the ethernet frames are made for each recipient that is coupled to the final edge router.

The method can include accessing ARP data to determine MAC addresses corresponding to the IP address for the destination addresses of the recipient communications, at block 764 in FIG. 7. The final edge router can include an address module 324 that can query a database or retrieve a file or information from a file to obtain the MAC address for the multicast group from the IP address. In a particular embodiment, converting the IP address to a MAC address for the multicast group may not be needed if the MAC address for the multicast group was retained by the ethernet frames of the initial communication when it was encapsulated. Further data from the same table or file or a different table or file, as compared to the table or file for the ARP data, can be used by the address module 324 to correlate the MAC address for the multicast group to particular MAC addresses of devices for the recipients.

The method can further include assigning MAC addresses to the destinations of ethernet frames of the destination communication, at block 766 in FIG. 7. In one embodiment, the address module 324 can replace the MAC address of the ethernet frames within the initial communication with a MAC address for a particular device within the multicast group. After the MAC addresses for particular devices have been used for the destination address, a destination communication has been generated. In this embodiment, the destination communication is a Layer 2 communication and includes a set of ethernet frames. In a particular embodiment, a multicast group may have 10 members. In this embodiment, 10 copies of the destination communication have the same source MAC address and different destination MAC addresses.

The method can still further include sending the destination communications to the particular MAC addresses corresponding to the particular devices that belong to the multicast group, at block 768 in FIG. 7. In one embodiment, the destination communications are sent by the final edge router and received by the particular devices of the recipients.

In other embodiments, customers can be instructed to perform one or more relatively simple tasks, such as checking a particular connection, rebooting a device, etc. If the customer desires, he or she can perform the task and get back to enjoying IPTV or other video service quicker than if a technician were dispatched. Additionally, scheduling and premises physical security issues can be avoided.

The system can be flexible enough to allow a customer to talk to a person (e.g., customer service representative) if the customer desires to not use an automated system.

EXAMPLE

The following specific example is meant to illustrate particular embodiments and not to limit the scope of the invention. This Example demonstrates that a communication can be sent to a plurality of different multicast groups more efficiently than if the communication were sent solely as Layer 2 communications to all device of end users or if the communication were sent to each multicast group as a separate communication.

In this Example, an end user in Detroit sends an initial communication as a broadcast to all other end users (recipients) within the network of a service provider, which is illustrated in FIGS. 8 to 12 and described in more detail below. In this Example, each city corresponds to a multicast group.

An end user at a client computer can compose an electronic mail message or other communication (hereinafter, "the initial email") to all users of the network. The initial email is in the form of ethernet frames that are sent from the client computer to an edge router in Detroit. The edge router will receive the initial email and determine the initial email is to be broadcast to all users in all of the multicast groups. The particular edge router can determine or have determined that some recipients are coupled to that particular edge router. The information for such a determination can be network topology information that a service provider collects or otherwise generates.

To the extent recipients in Detroit are coupled to the edge router that receives the initial email, copies of initial email can be made for each of those recipients. For each copy, the destination MAC address is changed to a particular MAC address for a particular device. The copies of the initial email are then sent as ethernet frames to those recipients.

Figure 8:
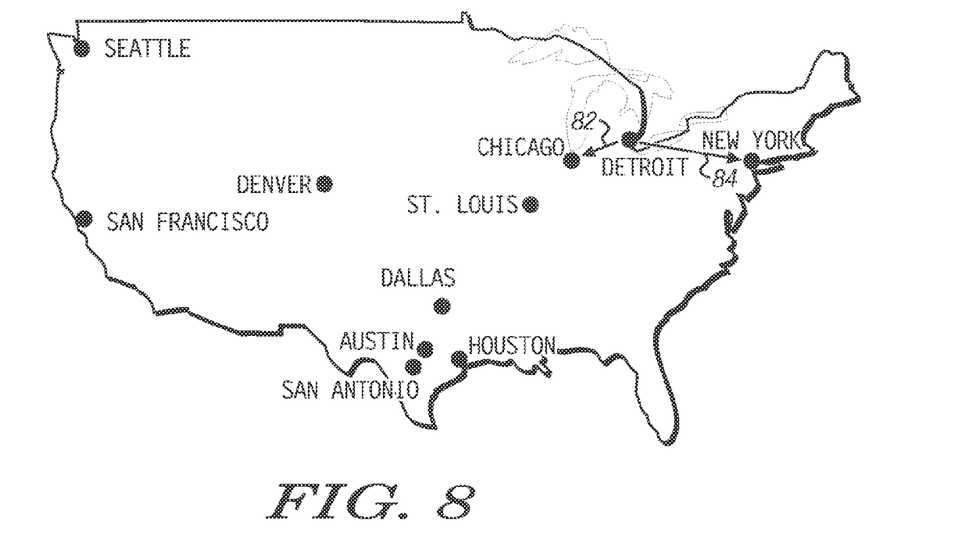
FIGS. 8 to 12 include an illustration of how a communication can be routed to different multicast groups in accordance with embodiments described herein; and The use of the same reference symbols in different drawings indicates similar or identical items.
Figure 9:
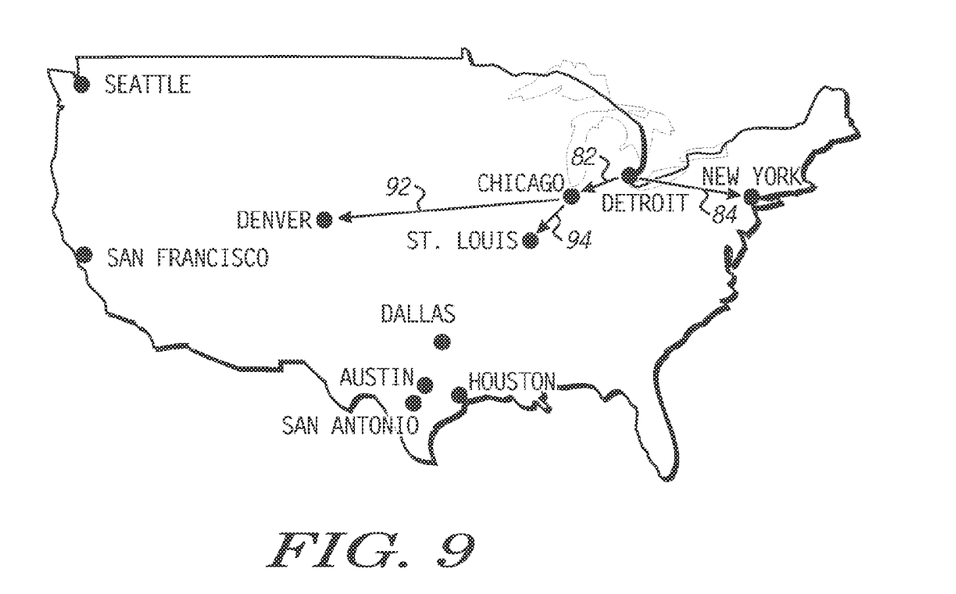

For all other recipients, the initial email can be encapsulated into packets, which will be used for a transport email. The number of copies of the packets depends on the network topology. Up to three copies of the packets will be made. One copy of the packets can be sent to another edge router in Detroit (for other recipients coupled to a different edge router in Detroit). The copy of packets in Detroit may not be needed, depending on the network topology or desires of the network operator. Referring to FIG. 8, another copy of the packets will be sent to New York City. Still another copy will be sent to Chicago. In the network topology in this particular example, all emails for multicast groups west of Chicago will be routed through Chicago. Rather than an edge router in Detroit generating and sending to Chicago nine copies of the packets for Chicago and sites west of Chicago (one copy per multicast group), only a single copy of the packets is sent to Chicago. Thus, rather than generating one copy for each multicast group (since networks are optimized more for multicast, rather than significantly less frequent broadcast, transmissions), one copy is generated for a particular site and all sites downstream from that particular site.

For each copy generated, the edge router in Detroit can access ARP data and replace the source MAC address with a corresponding source IP address, and replace the destination MAC address with a corresponding destination IP address. The particular edge router in Detroit can then send copies of the transport emails, in the form of packets, to another edge router in Detroit, to Chicago (illustrated by arrow 84 in FIG. 8) and to New York City (illustrated by arrow 82 in FIG. 8).

In Chicago, the receiving edge router can determine or have determined that one copy of the transport email is to be generated and sent to Denver (illustrated by arrow 92 in FIG. 9) for Denver and sites west of Denver, and another copy of the transport email is to be generated and sent to St. Louis (illustrated by arrow 94 in FIG. 9) for St. Louis and sites south of St. Louis.

Figure 10:
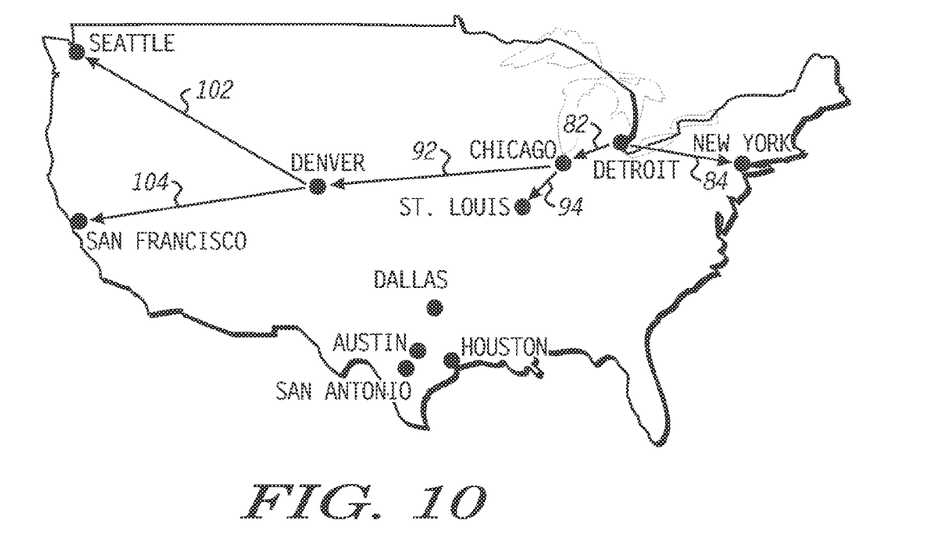
Figure 11:
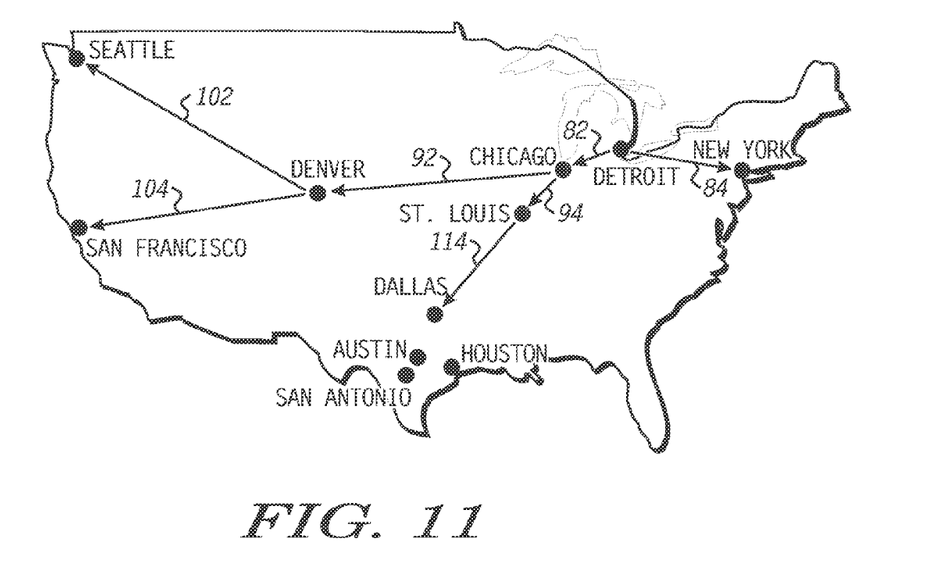

In Denver, the receiving edge router can determine or have determined that one copy of the transport email is to be generated and sent to Seattle (illustrated by arrow 102 in FIG. 10), and another copy of the transport email is to be generated and sent to San Francisco (illustrated by arrow 104 in FIG. 10). In St. Louis, the receiving edge router can determine or have determined that one copy of the transport email is to be generated and sent to Dallas (illustrated by arrow 114 in FIG. 11) for Dallas and sites within Texas.

Figure 12:
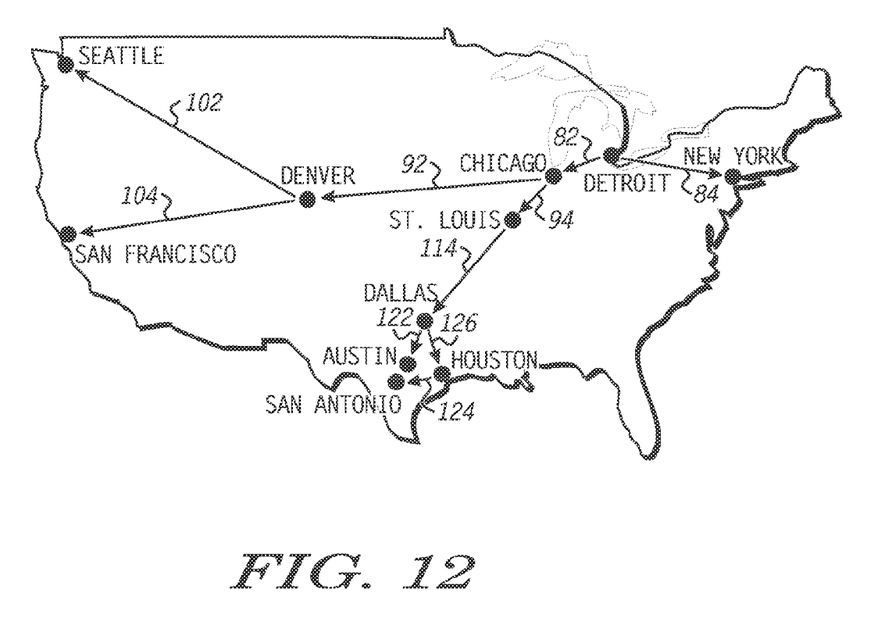

In Dallas, the receiving edge router can determine or have determined that one copy of the transport email is to be generated and sent to Austin (illustrated by arrow 122 in FIG. 12), another copy of the transport email is to be generated and sent to San Antonio (illustrated by arrow 124 in FIG. 12), and still another copy of the transport email is to be generated and sent to Houston (illustrated by arrow 126 in FIG. 12).

Copies of the transport emails will eventually reach final edge routers at each of the sites illustrated in FIG. 12. Each final edge router will unencapsulate the packets of the transport email to retrieve ethernet frames that made up the initial email. The final edge router can make a copy for each device coupled to the final edge router, wherein the device corresponds to each recipient within the particular multicast group. The destination addresses within the copies are replaced by the MAC addresses of the devices within the particular multicast group at that particular final edge router to generate destination communications. The final edge router sends the destination communications to devices that correspond to the destination MAC addresses.

In this Example, fewer copies of the email are being routed through the network, and therefore, more bandwidth is available for other communications or uses of the network. More specifically, only two copies of the transport email are made for sites outside Detroit. The copy that is sent to Chicago is used for all multicast groups in Chicago and sites west of Chicago. Therefore, in the Example, only one copy of the transport email is sent to Chicago, rather than nine copies (one copy for Chicago and eight copies for the multicast groups west of Chicago). At Chicago, two copies of the transport email are sent to Denver and St. Louis. One copy is used for all multicast groups in Denver and sites west of Denver, and the other copy is used for all multicast groups in St. Louis and sites south of St. Louis. Similarly to Chicago, only one copy of the transport email is sent to Denver, rather than three copies (one copy for Denver and two copies for multicast groups west of Denver), and only one copy of the transport email is sent to St. Louis, rather than five copies (one copy for St. Louis and four copies for multicast groups south of St. Louis). Thus, the load on the network is significantly reduced, particularly between Detroit and Chicago, between Chicago and Denver, and between Chicago and St. Louis.

Compare the Example to a method in which the network is optimized for each individual multicast group, rather than for a broadcast or a single copy of a communication for a plurality of different multicast groups at different sites. If the network is optimized for each individual multicast group, recipients would potentially receive their copies of the communication at their devices faster if a copy for each individual multicast is generated at the earliest point in the network (e.g., Detroit) and sent to the multicast groups from that point. This can be referred to as "near-end replication."

The Example does not use near-end replication, and therefore, does not leverage the network that is optimized for multicast traffic. The Example can result in communications reaching the recipients more slowly as compared to a near-end replication technique. In particular, when using the method described in the Example, delays can occur with additional processing (e.g., generating copies of the transport email) at routers along the transmission path. Thus, receipt of the email by recipients belonging to multicast groups that pass through more routers and sites (e.g., Austin, San Antonio, and Houston) may occur later, as compared to the same email and same recipients if one copy of the email would be generated for each multicast group at and sent from the first edge router (in Detroit) in the transmission path (i.e., near-end replication). While an embodiment in accordance with the Example can reduce the load on the network, it comes with additional delays associated with additional processing along the transmission path.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of routing a communication within a network can include receiving a first communication at a first edge router, wherein the first communication is a Layer 2 communication, and determining that the first communication has a destination that includes a first multicast group and a second multicast group different from the first multicast group. The method can also include encapsulating the first communication within a second communication, wherein the second communication is a Layer 3 communication, and wherein the second communication is a single communication, and sending the second communication towards the first multicast group and the second multicast group.

In one embodiment of the first aspect, the first communication is a broadcast communication. In a particular embodiment, the broadcast communication is to all multicast groups within the network, and sending the second communication includes sending the second communication towards all multicast groups. In another particular embodiment, the broadcast communication is to all multicast groups within the network, and sending the second communication includes sending the second communication towards a plurality, but not all, of the multicast groups. The method further includes sending a third communication towards a particular multicast group that is outside of the plurality of the multicast groups.

In another embodiment of the first aspect, the method further includes accessing first address resolution protocol data, and converting a first destination address of the first communication to a second destination address of the second communication, wherein the first destination address includes a media access controller address, and the second destination address includes an Internet protocol address. In a particular embodiment, the method further includes unencapsulating the second communication, generating a third communication using the second communication, wherein the third communication is a Layer 2 communication, and sending the third communication to media access control addresses corresponding to the first multicast group, the second multicast group, or both. In a more particular embodiment, the method further includes accessing second address resolution protocol data to convert the second destination address of the second communication to third destination addresses of the third communication, wherein the second destination address includes an Internet protocol address, and the third destination addresses include media access controller addresses.

In still another embodiment of the first aspect, the method further includes receiving the second communication at a second edge router, generating a third communication from the second communication, sending the third communication towards the first multicast group. The method still further includes generating a fourth communication from the second communication, wherein the fourth communication is different from the third communication, and sending a fourth communication towards the second multicast group. Each of the third communication and the fourth communication can include an Internet protocol address.

In a second aspect, a system can be used to route a communication within a network. The system can include an identification module operable to determine that a first communication has a destination that includes a first multicast group and a second multicast group different from the first multicast group, wherein the first communication is a Layer 2 communication. The system can also include an encapsulation module operable to encapsulate the first communication within a second communication, wherein the second communication is a Layer 3 communication, and the second communication is a single communication. The system can further include a transmitter module operable to send the second communication towards the first multicast group and the second multicast group.

In one embodiment of the second aspect, the first communication is a broadcast communication. In another embodiment, the system further includes an edge router and an intermediate router operable to receive the second communication from the transmission module and send the second communication towards the edge router, wherein the intermediate router is not an edge router. In still another embodiment, the system further includes a first address module operable to access first address resolution protocol data and convert a first destination address of the first communication to a second destination address of the second communication, wherein the first destination address includes a media access controller address, and the second destination address includes an Internet protocol address.

In a further embodiment of the second aspect, the system further includes a second address module operable to unencapsulate the second communication, access second address resolution protocol data, generate a third communication that includes a payload of the second communication, wherein the third communication is a Layer 2 communication, and send the third communication to media access control addresses corresponding to the first multicast group, the second multicast group, or both. In a particular embodiment, the first communication, the second communication, and the third communication include a same substantive information for consumption or use by a recipient and different metadata.

In still a further embodiment of the second aspect, the system further includes an edge router operable to receive the second communication, generate a third communication from the second communication, send the third communication towards the first multicast group, generate a fourth communication from the second communication, wherein the fourth communication is different from the third communication, and send a fourth communication towards the second multicast group.

A processor readable medium can include code, wherein the code includes instructions for the processor to carry out any of the methods described herein. The code can be executed by a single device (e.g., an edge router) or different portions or all of the code can be executed by a plurality of devices within a system.

Note that not all of the activities described above in the general description or the examples are required, that a portion of a specific activity may not be required, and that one or more further activities may be performed in addition to those described. Still further, the order in which activities are listed are not necessarily in the order in which they are performed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of routing a communication within a network comprising:

receiving a first communication at a first edge router, wherein the first communication is a Layer 2 communication, and the first communication is a broadcast communication to all multicast groups within the network;

determining that the first communication has a destination that includes a first multicast group and a second multicast group different from the first multicast group;

encapsulating the first communication within a second communication, wherein the second communication is a Layer 3 communication, and wherein the second communication is a single communication;

sending the second communication towards a plurality, but not all, of the multicast groups, the plurality including the first multicast group and the second multicast group; and sending a third communication towards a particular multicast group that is outside of the plurality of the multicast groups.

2. The method of claim 1, further comprising:

accessing first address resolution protocol data; and converting a first destination address of the first communication to a second destination address of the second communication, wherein:

the first destination address includes a media access controller address; and the second destination address includes an Internet protocol address.

3. The method of claim 2, further comprising:

unencapsulating the second communication;

generating a fourth communication using the second communication, wherein the fourth communication is a Layer 2 communication; and sending the fourth communication to media access control addresses corresponding to the first multicast group, the second multicast group, or both.

4. The method of claim 3, further comprising accessing second address resolution protocol data to convert the second destination address of the second communication to fourth destination addresses of the third communication, wherein:

the second destination address includes an Internet protocol address; and the third destination addresses include media access controller addresses.

5. The method of claim 1, further comprising:

receiving the second communication at a second edge router;

generating a fourth communication from the second communication;

sending the fourth communication towards the first multicast group;

generating a fifth communication from the second communication, wherein the fifth communication is different from the fourth communication; and sending a fifth communication towards the second multicast group, wherein each of the fourth communication and the fifth communication includes an Internet protocol address.

6. A non-transitory processor readable medium comprising code, wherein the code includes instructions for the processor to carry out a method comprising:

accessing a first communication, wherein the first communication is a Layer 2 communication, and the first communication is a broadcast communication to all multicast groups within the network;

determining that the first communication has a destination that includes a first multicast group and a second multicast group different from the first multicast group;

encapsulating the first communication within a second communication, the second communication is a Layer 3 communication, and the second communication is a single communication;

sending the second communication towards a plurality, but not all, of the multicast groups, the plurality including the first multicast group and the second multicast group; and sending a third communication towards a particular multicast group that is outside of the plurality of the multicast groups.

7. The non-transitory processor readable medium of claim 6, the code includes further instructions for the processor to carry out the method further comprising accessing first address resolution protocol data to convert a first destination address of the first communication to a second destination address of the second communication, wherein:

the first destination address includes a media access controller address; and the second destination address includes an Internet protocol address.

8. The non-transitory processor readable medium of claim 7, the code includes further instructions for the processor to carry out the method further comprising:

unencapsulating the second communication;

generating a fourth communication that includes a payload of the second communication, wherein the fourth communication is a Layer 2 communication; and sending the fourth communication to media access control addresses corresponding to the first multicast group, the second multicast group, or both.

9. The non-transitory processor readable medium of claim 8, the code includes further instructions for the processor to carry out the method further comprising accessing second address resolution protocol data to convert the second destination address of the second communication to third destination addresses of the fourth communication, wherein:

the second destination address includes an Internet protocol address; and the third destination addresses include media access controller addresses.

10. The non-transitory processor readable medium of claim 9, wherein the first communication, the second communication, and the third communication include a same substantive information for consumption or use by a recipient and different metadata.

11. The non-transitory processor readable medium of claim 6, the code includes further instructions for the processor to carry out the method further comprising:

accessing the second communication;

generating a fourth communication from the second communication;

sending the fourth communication towards the first multicast group;

generating a fifth communication from the second communication, wherein the fifth communication is different from the fourth communication; and sending a fifth communication towards the second multicast group.

* * * * *